April 7, 1936.    G. S. BABCOCK ET AL    2,036,387
WRAPPING MATERIAL
Filed June 15, 1932

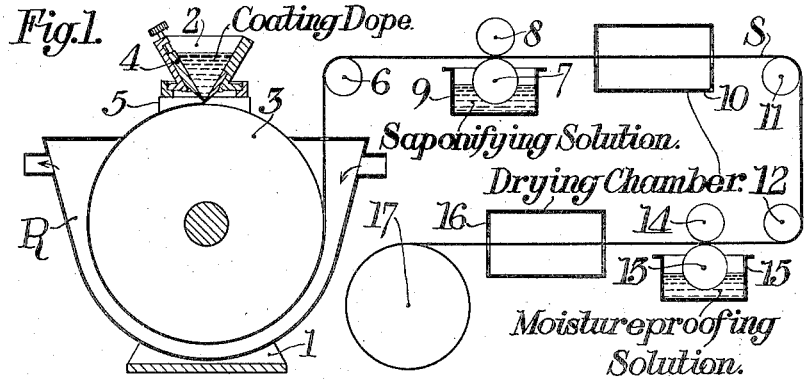

Fig.1.

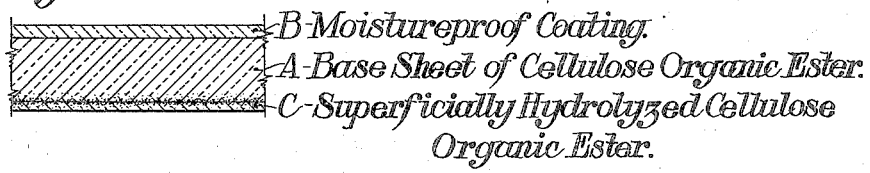

Fig.2.
B-Moistureproof Coating.
A-Base Sheet of Cellulose Organic Ester.
C-Superficially Hydrolyzed Cellulose Organic Ester.

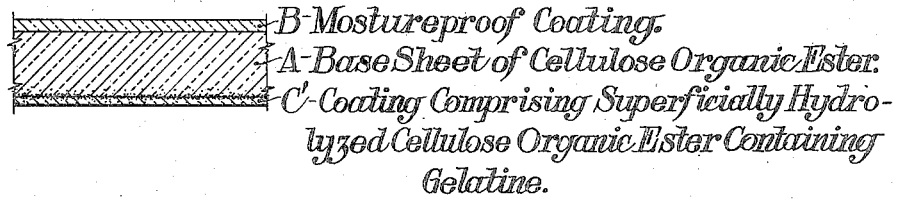

Fig.3.
B-Mostureproof Coating.
A-Base Sheet of Cellulose Organic Ester.
C'-Coating Comprising Superficially Hydrolyzed Cellulose Organic Ester Containing Gelatine.

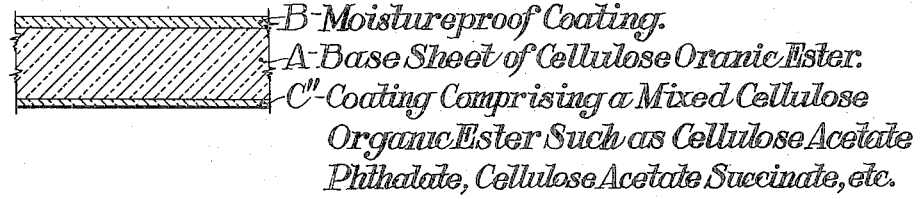

Fig.4.
B-Moistureproof Coating.
A-Base Sheet of Cellulose Oranic Ester.
C"-Coating Comprising a Mixed Cellulose Organic Ester Such as Cellulose Acetate Phthalate, Cellulose Acetate Succinate, etc.

Inventors:
George S. Babcock & Norman F. Beach,
By
Daniel J. Mayne
Attorneys.

Patented Apr. 7, 1936

2,036,387

UNITED STATES PATENT OFFICE

2,036,387

WRAPPING MATERIAL

George S. Babcock and Norman F. Beach, Rochester, N. Y., assignors to Eastman Kodak Company, Rochester, N. Y., a corporation of New York Application June 15, 1932, Serial No. 617,349

12 Claims. (Cl. 91—68)

This invention relates to wrapping materials, and has particular reference to a thin, flexible, transparent type of cellulosic sheeting adapted for the application of water-soluble adhesives thereto.

Several types of flexible, transparent sheeting formed from cellulosic material have been developed in recent years and have found wide use as wrapping material and in the manufacture of many kinds of packages, cartons, envelopes, and other containers. Some of these wrapping materials have been water-proofed or moisture-proofed by the application to one or both sides of a water-resistant composition, while others have not been so treated. The moistureproof materials have met with some degree of success due to their peculiar properties of water-resistance, transparency, flexibility, toughness, and general adaptability to wrapping purposes. Notwithstanding these useful properties, they have one serious drawback, namely, the fact that the ordinary types of cellulosic surfaces are not suitable for the application of water-soluble adhesives. It is a matter of common knowledge that when a tax stamp, label, gummed strip or the like having an adhesive surface of glue, gum arabic, or other water-soluble adhesive materials, is moistened and applied to the above mentioned types of cellulosic sheeting, it almost immediately curls up and drops off because of the incompatibility of the adhesive substance and the cellulosic material. This inability of these materials to permanently receive a water-soluble adhesive is accentuated in those cases where application of the adhesive is made over a moistureproof coating.

This, we think, is true of the well known type of viscose or regenerated cellulose sheeting which is moisture-proofed upon both sides thereof by a nitrocellulose or other cellulose derivative lacquer. A water soluble adhesive coated stamp or other object has the same inability of adhering to such moisture-proofed surface as it does to sheeting composed of a cellulose derivative. It is unsatisfactory to moisture-proof only one side of such regenerated cellulose sheeting and attempt to stick a stamp on the opposite or uncoated surface for the reason that, while the stamp will adhere to a certain degree (although not tenaciously) such a sheet when moisture-proofed upon one side is totally unsuccessful as a moisture resisting material for the reason that difficulty is encountered in packaging therewith under anything except substantially dry conditions. Furthermore, the sheet will buckle and change in dimensions during varying atmospheric conditions and is not in any sense moisture-proofed for the reason that the regenerated cellulose base takes up moisture quite rapidly and is very permeable to moisture even though it has been coated upon one side with a moisture-proof coating. In order to overcome this difficulty a number of remedies have been suggested including the proposal to use a special type of adhesive on the stamps or labels themselves, or to employ a special adhesive cement when affixing them which cement would be compatible with the cellulosic surface, but none of these remedies have thus far proved convenient or commercially practicable.

It is the primary object of our invention to overcome the difficulties just referred to, and to provide a means whereby the ordinary types of water-soluble adhesives may be successfully employed with cellulosic sheeting. Another and specific object is to provide a means for applying the conventional types of gummed labels, tax stamps, and other matter having a surface coated with a water-soluble adhesive, to cellulose sheeting by merely moistening the adhesive surface and affixing the stamp or label in the customary manner. A further and more specific object is to provide a new type of moisture-resistant cellulosic sheeting having one surface adapted to the application of water-soluble adhesives such as glue and gum arabic. Another object is to provide a process for the manufacture of such sheeting. Other objects will hereinafter appear.

After carrying on extensive research in which the problem was attacked from an entirely different angle from any thus far proposed, we have now arrived at a successful solution of the difficulties heretofore encountered. Our invention is based upon treating one surface of the cellulosic sheeting with certain solutions which, after evaporation of solvent, produce upon the surface of the material to which they are applied an extremely thin layer of a substance of different composition from the material of the sheet itself, the formation of which layer renders the sheet adaptable to the application of the common water-soluble adhesives. The invention is primarily concerned with the production of the type of cellulosic wrapping material above referred to, having a thin layer of a moistureproofing composition on one side, but distinguished by having the other normally untreated surface prepared in the manner hereinafter described.

We have found that a number of different substances may be applied in solution to accomplish the desired result. For example, we may apply a solution containing a saponifying or hydrolyzing agent, such as sodium hydroxide, which reacts with the superficial portions of the cellulose ester base sheet, removing a small percentage of the acyl groups and producing an extremely thin, homogeneously united surface layer of hydrolyzed cellulose ester. Other means of producing the desired surface layer coming within the broad scope of our invention include the application of hydrolyzing solutions of sodium or potassium hydroxide and the like together with small percentages of substances, such as casein and gelatin. While not a necessary element of our invention, the use of gelatin or casein in the hydrolyzing solution is desirable in that its deposit upon the sheet, even in minute quantities, provides a surface material to which water-soluble adhesives will readily stick. We have found that the superficially hydrolyzed or saponified surface layer, with or without the use of gelatine or casein, is well adapted to the application of the common water-soluble adhesives, and that an ordinary stamp or label may be as effectively and tenaciously affixed to it as to other ordinary types of wrapping material. This is more fully described and specifically claimed in our application Serial No. 588,596 filed Jan. 25, 1932 of which the present application is a continuation of the broad concept of this invention.

In addition to the above mentioned substances which may be applied to cellulosic sheeting for the purpose above specified, also included in the broad scope of our invention, are natural or synthetic gums and resins soluble in organic solvents, but insoluble in water, when used in solution in a common solvent in connection with certain other water-soluble materials. The primary function of the gum is to provide adhesion of the special coating layer to the base sheet, while the other dissolved component provides a material in the resulting coating layer which is slightly dissolved by the water applied to a stamp or label, thus allowing the gum or other adhesive on the label to mingle with the coating, thereby causing permanent adhesion of the stamp to the cellulosic surface. It should be noted here that the choice of the organic solvent for use in the type of solution just alluded to depends largely on the thickness of the sheeting to which it is applied. On the choice of this solvent depends the choice of the gum or resin and the water-soluble component. If the material is of a thickness of about .002", a solvent must be chosen that has no substantial dissolving effect on the sheeting itself. The selection of the solvent will also depend upon the particular type of sheeting to which it will be applied, it being necessary to avoid a substantial dissolving action thereon or even an action sufficient to produce a degree of softening of the sheet which would undesirably weaken it. Assuming the case of a cellulose acetate sheeting, ethyl alcohol, toluene, or benzene may be used. If ethyl alcohol is used, the gum and water-soluble components of the solution, which may be designated respectively as (a) and (b), may be selected from the following materials.

*Component (a)*

Resins of the vinyl acetate type, resins of the vinyl acetate-vinyl chloride type, resins of the polychlordiphenyl type, gum dammar, gum mastic, gum gamboge, gum ammoniac, and other substances soluble in alcohol.

*Component (b)*

Adipic acid, thiourea, acetanilide, ammonium benzoate, boric acid, citric acid, hexamethylene tetramine, tartaric acid, tannic acid, and other substances soluble in alcohol and water.

If benzene is used, the components are as follows:

*Component (a)*

Resins of the vinyl acetate type, resins of the vinyl acetate-vinyl chloride type, resins of the polychlordiphenyl type, and other natural or synthetic resins soluble in benzene, gum guaiac, gum thus, gum chicle.

*Component (b)*

Bird lime (glue), ortho dihydroxybenzene (pyrocatechol), p-amino dimethyl aniline, b-naphthylamine, resorcinol, urea.

The use of the above substances is more fully described in the copending application of Wilmer Kallock Serial No. 617,345, filed June 15, 1932.

Typical examples of coating compositions for the production of surfaces of the above described type on moistureproof cellulosic sheeting are given below, it being understood that these compositions represent merely a few of the preferred embodiments of our invention and are not in any sense a limitation thereof.

*Hydrolyzing compositions*

1

| | Parts by weight |
|---|---|
| Potassium hydroxide | 1 |
| Methyl alcohol | 70 |
| Water | 28 |
| Gelatin | 1 |

2

| | Parts by weight |
|---|---|
| Potassium hydroxide | 5 |
| Methyl alcohol | 30 |
| Water | 70 |
| Gelatin | 2.5 |

3

| | Parts by weight |
|---|---|
| Sodium hydroxide | .5 |
| Ammonium hydroxide | 1.5 |
| Methyl alcohol | 77 |
| Water | 20 |
| Casein | 1 |

In the above formulae, the gelatin and casein are added primarily to act as carriers and to form a base to which the adhesive eventually to be applied will stick, it being understood, of course, that the proportions of the various ingredients may be varied within wide limits depending upon the extent of chemical action desired on the treated surface or the amount of solution to be applied thereto. As previously stated, it is not necessary for the purpose of our invention that geltine or casein be included in the formula, since its function is auxiliary only. If it is desired to carry the hydrolyzing action of the alkali to a considerable extent, this is accomplished by increasing the percentage of the alkali in the solution, whereas, if only a very slight amount of hydrolysis is desired, the percentage of alkali is correspondingly decreased. The alkali normally superficially saponifies the cellulose ester sheeting and thereby hydrolyzes one of its surfaces. The methyl alcohol is used to effect an even spread as well as to prevent the development of non-transparency or blushing.

Adhesive compositions containing water-soluble components

1

| | Parts by weight |
|---|---|
| Vinyl acetate | 3 |
| Tartaric acid | 2 |
| Ethyl alcohol | 95 |

2

| | Parts by weight |
|---|---|
| Vinyl acetate | 3 |
| Resorcinol | 2 |
| Benzene | 95 |

The above formulæ are applicable to the treatment of thin sheeting of the order of .001–.002". If thicker sheeting than .002" is used, the formula may be as follows:

3

| | Parts by weight |
|---|---|
| Vinyl acetate | 3 |
| Adipic acid | 2 |
| Ethyl alcohol | 47.5 |
| Methyl alcohol | 47.5 |

The above formulæ are characterized by the inclusion of a water-soluble ingredient, such as tartaric acid, resorcinol, and the like, which is susceptible of being dissolved, or partially dissolved, by the water applied to the gummed label, or stamp which it is desired to attach to the cellulosic sheeting, thereby permitting the adhesive material on the stamp to mingle with the coating causing permanent adhesion.

Compositions containing mixed cellulose organic esters containing free carboxyl radicals 1. Cellulose acetate-phthalate containing 22% phthalyl is made up into a 1-2% solution in a solvent comprising 50% by volume of cellosolve and 50% by volume of toluene.

2. Cellulose acetate-phthalate containing 28.4% phthalyl is made up into a 1-2% solution in a solvent comprising 85% ethylene chloride and 15% iso-propyl alcohol.

3. Cellulose acetate-phthalate containing 34.5% phthalyl is made up into a 1-2% solution in a solvent comprising 95% ethylene chloride and 5% ethyl alcohol.

4. Cellulose acetate-phthalate containing 45.3% phthalyl is made up into a 1-2% solution in a solvent comprising 40% cellosolve and 60% toluene.

5. Cellulose acetate-succinate containing 20.6% succinyl is made up into a 1-2% solution in a solvent comprising 50% methyl cellosolve and 50% toluene.

The use of the above compositions is more fully described in the copending application of William O. Kenyon and Russell H. Van Dyke, Serial No. 617,342, filed June 15, 1932.

In the above examples of coating compositions which will render the surface of moistureproofed and unmoistureproofed cellulose ester sheeting adapted for the permanent application of water-soluble adhesives, the specific formulæ given under the headings "Adhesive compositions containing water-soluble components" and "Compositions containing mixed cellulose organic esters containing free carboxyl radicals" are included for purposes of illustrating the broad scope and application of our invention, but these specific formulæ are not part of our invention but are the invention of Wilmer Kallock, and William O. Kenyon and Russell H. Van Dyke, respectively, and are described in their co-pending applications, above referred to.

In the preferred form of our invention, we carry out our process in a continuous manner, starting with an operation in which an untreated and unmoistureproofed sheet is first formed by coating a cellulose ester dope of the desired composition onto a coating roll followed by stripping the sheet from the roll. This sheet is then given a special treatment wherein a hydrolyzing solution or one of the solutions described above is applied to its under surface, and is then dried at an appropriate temperature. The sheet is next subjected to a second operation, in which the waterproofing composition is applied to the opposite surface.

In the following description, we have set forth one of the preferred embodiments of our invention, but it is to be understood that the description and examples given are merely illustrative and are not intended to constitute a limitation upon our invention.

In the accompanying drawing in which like reference characters refer to like parts:

Fig. 1 is a semi-diagrammatic showing illustrating the principal steps in the process of manufacturing our improved type of sheeting.

Fig. 2 represents a cross-section of the finished sheet, the thickness of the base sheet and the outer layers being greatly exaggerated for the sake of clearness.

Fig. 3 represents a cross section of a finished sheet which differs from that of Fig. 2 only in that the specially treated surface layer contains gelatin.

Fig. 4 represents a cross section of a sheet which differs from those of both Figs. 2 and 3 in that the special surface layer contains a mixed cellulose organic ester.

Assuming the process to be carried out as a continuous process, a cellulose ester dope, such as a dope made by dissolving cellulose acetate in acetone, and adding whatever additional ingredients, such as plasticizers or coloring matter, may be desired, and in such amounts as to give the required degree of transparency or translucency, flexibility, and other characteristics, is placed in the V-shaped trough 2 mounted on the base 5 of a conventional type of roll coating machine 1. From this trough the dope flows down onto the coating roll 3, through adjustable gate 4 which may be adjusted to control the thickness of the sheet being formed preferably to approximately .001." The sheet which we will designate as S, after proper coagulation in the enclosed space formed by the solvent recovery chamber R through which a current of heated air or other coagulating fluid may be led in the direction indicated by the arrows, passes over guide roll 6 and directly between subbing roll 7 and squeeze roll 8. During passage through these rolls, the subbing roll 7 carries up a portion of the treating solution contained in vat 9 and applies it to the under side of sheet S, squeeze roll 8 being adjusted with respect to subbing roll 7 in any known and convenient manner so that the correct amount of the solution is applied to the sheet.

After the solution has been applied to the sheet S as described above, the sheet is passed at a speed of approximately 10-30 feet per minute through drying chamber 10, the interior of which is maintained at a temperature of about 210° F.

After emerging from the drying chamber, the sheet S passes over guide rolls 11 and 12 and thence between subbing roll 13 and squeeze roll 14. In passing between the latter two rolls, subbing roll 13 carries up a portion of the moistureproofing solution contained in vat 15 and applies it to the untreated surface of the sheet, the squeeze roll 14 functioning as in the case of roll 8 previously described, to regulate the amount of coating fluid applied and to remove any excess fluid from the sheet. Passing from the moistureproofing operation, the sheet travels through drying chamber 16 which is also maintained at a temperature in the vicinity of 210° F., at a speed of about 10-30 feet per minute. Upon emerging therefrom, the finished sheet is then wound on roll 17. Appropriate tests reveal that the resistance to moisture transmission of the finished sheeting is excellent and that any of the ordinary adhesives will now readily stick to the specially treated surface.

It will be apparent that many modifications may be made in apparatus and process or materials employed, within the scope of our invention. It may be said that any suitable type of apparatus, such as would be suggested to those skilled in the art, may be employed, the particular pieces of apparatus employed forming no part of our invention. The specific operating conditions may be varied, if desired. For example, the preferred drying temperatures may range from about 180° to 230° F., but higher or lower temperatures may also be used. The particular temperature employed will also depend upon the particular type of sheeting dealt with, its plasticizer content and other factors known to those skilled in the art. In general, it may be said that the temperature should not in any event rise to a degree which will cause appreciable softening or weakening of the material.

The dope formula from which the original thin sheet is coated may vary within wide limits depending upon the particular properties desired in the finished product. Solutions ranging from 3-1 to 5 to 1 of solvent, such as acetone, to cellulose acetate may be conveniently employed. Various plasticizers for the particular ester selected may be used. For example, when using cellulose acetate, any of the well known cellulose acetate plasticizers, such as butyl sulphone, diethyl phthalate, dimethyl phthalate, monochlornaphthalene, triphenyl phosphate, tricresyl phosphate, ethyl acetanilide, penta erithritol acetate, hexachlorobenzene, ethyl-p-toluene sulfonamide, thymol, and choretone, are suitable. In addition, if, instead of a partially transparent sheet, it is desired to produce a colored or translucent sheet, various ingredients such as coloring materials and pigments may also be added. Furthermore, these ingredients may be optionally included in the moistureproofing composition rather than in the dope formula. Any suitable cellulose organic ester solvent may be employed. In the case of cellulose acetate, the solvent employed may be acetone or an appropriate mixture of solvents, such as alcohol and ethylene chloride. While we have described our invention generally by reference to a base sheet comprising a single cellulose organic ester such as cellulose acetate, other single esters such as cellulose propionate and cellulose butyrate, or mixed esters such as cellulose acetate butyrate and cellulose acetate stearate may also be successfully employed.

For the moistureproofing operation, we prefer to use that described in the co-pending application of Norman F. Beach and Bruce E. Gramkee, Serial No. 551,491, filed July 17, 1931, and involving the application of a solution of gum and wax in a common solvent to one side of a base sheet of cellulose acetate or other cellulose organic derivative. In some cases, however, it may be preferable to employ the process disclosed in the application of Norman F. Beach and James G. McNally, Serial No. 551,490, filed July 17, 1931, in which the cellulose sheeting is first coated with a gum or resin solution, followed by the application of a wax solution. It should be noted that in applying either of the above methods of coating or any equivalent method, the sheet is coated on one surface only, the opposite surface being left free for the production of the superficial layer of material adaptable for the application of water-soluble adhesives.

Although we prefer to carry out our process as a continuous operation beginning with the roll coating of the base sheet as illustrated in Fig. 1, we may begin by applying the treating solution to the uncoated surface of a previously formed unmoisture-proofed cellulosic sheet and thereafter moistureproofing the opposite side.

Furthermore, while we prefer to treat one surface of the cellulose ester sheeting so as to permanently receive an adhesive directly as it comes from the roll coating machine and thereafter carry it through the moistureproofing composition, the moistureproofing step may precede the special treatment.

In any event, the finished sheeting comprises a base sheet of cellulose organic ester material having one surface coated with a moistureproofing composition and the other comprising an extremely thin layer of a material having a different composition from that of the base sheet, which material renders this surface adapted to the application of water-soluble adhesives. As previously indicated, this thin layer may consist of superficially saponified cellulose ester, a gum containing layer including also a water-soluble component, such as tartaric acid, resorcinol, and the like, or may consist of a mixed cellulose organic ester, at least one of the acyl groups of which contains free carboxyl.

Reference to Fig. 2 will aid in giving a clearer understanding of the characteristics of our finished product, it being understood that the relative thickness of the base sheet and its coating is greatly exaggerated for the sake of clearness. The base sheet A is preferably of cellulose acetate, but we do not limit ourselves to this particular type of cellulosic material, as we may employ with substantially equal facility nearly all of the cellulose organic ester materials which may be coated in thin, flexible, transparent sheets, such as cellulose propionate or the mixed esters, such as cellulose acetate-propionate, cellulose acetate-butyrate, and, in fact, any suitable cellulose organic ester material, the surface of which can be superficially hydrolyzed or otherwise treated as hereinabove described.

Figs. 3 and 4 will also aid in a clearer understanding of the various types of surfaces produced according to our invention and to which water-soluble adhesives will permanently adhere. As in the material disclosed in Fig. 2, the base sheet may consist of any of the materials alluded to in the previous paragraph, such as cellulose propionate or the mixed esters, such as acetate-propionate, acetate-butyrate, and the like.

The thickness of this base sheet may vary within comparatively wide limits depending upon the use for which it is intended, but, in general, it may be said that in producing material suitable for ordinary wrapping purposes we prefer a thickness of approximately .001". The several layers B, C, C', and C", will ordinarily be extremely thin, say, of the order of about .0001" to .00001", but the thickness of these layers may also vary widely.

The waterproofing layer B will ordinarily comprise gum and wax together with whatever additional ingredients may have been added to the original coating solution, such as pigments, coloring matter, or plasticizers. The respective layers, C, C', and C" of the types of sheeting shown in Figs. 2, 3, and 4 will consist, respectively, of an extremely thin layer of superficially hydrolyzed cellulose ester containing gelatin, and a layer comprising a mixed cellulose organic ester such as cellulose acetate phthalate.

Having described our improved product and one of its preferred methods of manufacture, it only remains to point out generally its mode of application. From the foregoing description it is evident that in using the material for wrapping purposes, the manufacture of cartons and the like, the moistureproof surface should form the inner surface, while the specially treated surface should, of course, remain outside. The fact that the moistureproofed side of the sheet is inside will not affect its moisture resisting qualities.

It will thus be seen that our invention has successfully solved a serious problem which has confronted manufacturers and users of cellulosic sheeting in that it has provided a new type of material to which stamps, labels, and other matter treated with the ordinary types of water-soluble adhesives, may be applied. It is found that these labels, stamps, etc., will now adhere firmly and tenaciously to the specially treated surface of the new material and, in fact, will stick as solidly to it as to ordinary paper, cardboard, and the like. The invention not only makes it possible for manufacturers, such as cigarette and tobacco producers, to now apply the required revenue stamps to their packages without the use of special cements and without requiring the stamps to be specially treated, but it also enables them and manufacturers of a multitude of other products to seal packages, cartons, envelopes and other containers by simply pasting onto the new material the ordinary gummed sealing strips or even to apply the water-soluble adhesives themselves directly to the portions it is desired to seal. These are only typical examples of uses of the new material selected at random and many others will suggest themselves to those skilled in the art.

As is well known, a considerable amount of waste occurs in the ordinary operations of manufacturing coated sheeting and in its use as wrapping and packaging material. This would represent a serious economic loss were it not for recovery processes in which the various ingredients of the sheeting can be reclaimed. The material of the present invention is characterized by the fact that it lends itself particularly well to such recovery processes. A simple and convenient method of reclaiming scrap derived from moisture-proof sheeting of the type herein described comprises leaching the scrap with an organic solvent which may consist, for example, of a mixture of about equal parts of ethylene chloride and Stoddard solvent (a mixture of low boiling aliphatic hydrocarbons having a boiling range of approximately 141–210° C.) the leaching operation being carried out at a temperature of about 80° F. This removes the moisture-proof coating. The base sheet is then dissolved in acetone or other appropriate solvent except for the relatively small amount of gelatine and hydroyzed material forming the homogeneously united layer of stamp adhering material, which being insoluble in acetone, remains in suspension and may be removed by filtration. The resulting dope may be used in the production of further batches of thin sheeting, film and the like.

The material of the present invention is further characterized by the fact that it lends itself particularly well to the formation of joints or seals when used in the manufacture of a variety of containers, such as cartons, cigarette packages, cigar wrappers and the like. In producing such joints or seals, a solvent sealing agent is employed which has the power of dissolving the moisture proofing composition on the moistureproofed surface and of penetrating the hydrolyzed surface so that when the two moistened surfaces are brought together and pressure is applied, a fluxing of the contiguous portions takes place with the resultant formation of a strong durable joint. In some cases, it may be desirable to produce an especially strong union between the sheets which cannot be broken without mutilation of the individual sheets. A solvent sealing agent suitable for this purpose may comprise any one of the following combinations:

Equal volumes of cyclohexanone and 1,4 dioxan, equal volumes of acetone and ethylene glycol monomethyl ether, equal volumes of chloroform, ethyl alcohol, acetone, and ethylene glycol monomethyl ether, ethyl lactate, one volume of ethyl lactate and two volumes of 1,4 dioxan, two volumes of tetrachlorethane and one of n-butyl alcohol.

In other cases, it may be desirable to produce a union which, while sufficiently strong to prevent the respective layers of the material from separating, nevertheless permits their separation without tearing. Solvent sealing agents for this purpose may be selected from the following:

Cyclohexanone, equal volumes of cyclohexanone and ethyl alcohol, equal volumes of ethylene glycol monoethyl ether and ethyl alcohol, two volumes of ethyl lactate and one volume each of cyclohexanone and chloroform, approximately equal volumes of tetrachlorethane and ethyl alcohol, two volumes of tetrachlorethane to one each of n-butyl alcohol and of acetone.

The particular solvent sealing agent will be selected according to the type of joint it is desired to produce. As a general rule, a sealing agent should have the property of penetrating to some extent into the material of the base sheet, but this penetration should not go to the point of actual solution of the material. The above indicated sealing agents have the power of penetrating the sheeting to the proper degree to cause the contacting portions of the respective sheets to coalesce without producing an undesirable weakening thereof. In the case of the thicker types of sheeting, the solvent power of the sealing agent need not be as carefully controlled as is the case with the thinner type.

What we claim is:

1. An article of manufacture comprising a thin, flexible, transparent cellulose organic acid ester wrapping sheet to which a moist water-soluble adhesive will not readily adhere, one surface of which sheet is coated with a moistureproofing composition and the other surface of which is composed of a non-adhesive cellulose derivative layer substantially integral with the cellulose ester material of the base sheet and of such constitution that a moist water-soluble adhesive will permanently adhere thereto.

2. An article of manufacture comprising a thin, flexible, transparent cellulose organic acid ester wrapping sheet to which a moist water-soluble adhesive will not readily adhere, one surface of which sheet is coated with a moistureproofing composition and the other surface of which is composed of a non-adhesive cellulose derivative layer substantially integral with, but of different chemical constitution than the cellulose ester material of the base sheet, said layer being of such constitution that a moist water-soluble adhesive will permanently adhere thereto.

3. An article of manufacture comprising a thin, flexible transparent wrapping sheet of cellulose organic acid ester material, one surface of which is coated with a moistureproofing composition and the other surface of which is partially hydrolyzed.

4. An article of manufacture comprising a thin, flexible, transparent wrapping sheet of cellulose acetate, one surface of which is coated with a moistureproofing composition, the other surface comprising partially hydrolyzed cellulose acetate.

5. An article of manufacture comprising a thin, flexible, transparent wrapping sheet of cellulose organic acid ester material, one surface of which is coated with a moistureproofing composition, the other surface comprising partially hydrolyzed cellulose ester and gelatine.

6. An article of manufacture comprising a thin, flexible transparent wrapping sheet of cellulose acetate, one surface of which is coated with a moistureproofing composition, the other surface comprising partially hydrolyzed cellulose acetate and gelatine.

7. An article of manufacture comprising a thin, flexible, transparent wrapping sheet of mixed cellulose organic acid ester material, one surface of which is coated with a moistureproofing composition, the other surface comprising partially hydrolyzed mixed cellulose ester.

8. An article of manufacture comprising a thin, flexible, transparent wrapping sheet of cellulose acetate-propionate, one surface of which is coated with a moistureproofing composition the other surface comprising partially hydrolyzed cellulose acetate-propionate.

9. The process of producing a moistureproof cellulose organic acid ester wrapping sheet to which water-soluble adhesives will permanently adhere, which comprises forming a thin, flexible, transparent sheet of cellulose organic ester, hydrolyzing one surface of the sheet, and applying a moistureproofing composition to the unhydrolyzed surface.

10. The process of producing a moistureproof cellulose acetate wrapping sheet to which water-soluble adhesives will permanently adhere, which comprises forming a thin, flexible transparent sheet of cellulose acetate, applying a hydrolyzing solution to one surface of the sheet, and then applying a moistureproofing composition to the other surface thereof.

11. A container the walls of which comprise a cellulose organic ester sheet material, the outer surface of which is partially hydrolyzed and the inner surface of which is coated with a moistureproofing composition.

12. A container the walls of which comprise a sheet of cellulose acetate, the outer surface of which is partially hydrolyzed, and the inner surface of which is coated with a moistureproofing composition.

GEORGE S. BABCOCK.
NORMAN F. BEACH.